United States Patent
Heilskov et al.

(10) Patent No.: US 10,378,820 B2
(45) Date of Patent: Aug. 13, 2019

(54) MIXED FLOW GRAIN DRYER WITH VACUUM COOL HEAT RECOVERY SYSTEM

(71) Applicant: Sukup Manufacturing Co., Sheffield, IA (US)

(72) Inventors: Casey Scott Heilskov, Hampton, IA (US); Kerry Hartwig, Iowa Falls, IA (US); Tyler Rau, Stanley, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 113 days.

(21) Appl. No.: 15/131,865

(22) Filed: Apr. 18, 2016

(65) Prior Publication Data

US 2017/0299263 A1    Oct. 19, 2017

(51) Int. Cl.
| | |
|---|---|
| *F26B 3/00* | (2006.01) |
| *F26B 17/12* | (2006.01) |
| *F26B 3/14* | (2006.01) |
| *F26B 23/00* | (2006.01) |
| *F26B 21/04* | (2006.01) |

(52) U.S. Cl.
CPC ............ *F26B 17/128* (2013.01); *F26B 3/14* (2013.01); *F26B 17/126* (2013.01); *F26B 21/04* (2013.01); *F26B 23/007* (2013.01); *F26B 2200/06* (2013.01); *Y02P 70/40* (2015.11); *Y02P 70/405* (2015.11)

(58) Field of Classification Search
CPC ........ F26B 17/128; F26B 17/12; F26B 17/00; F26B 17/1408; F26B 17/14; F26B 3/14; F26B 2200/06

USPC .................................... 34/165, 167, 436, 476
See application file for complete search history.

(56) References Cited

U.S. PATENT DOCUMENTS

| | | | |
|---|---|---|---|
| 3,053,522 A * | 9/1962 | Applegate | ............. F26B 17/122 34/174 |
| 3,300,873 A | 1/1967 | Bussell et al. | |
| 3,896,562 A | 7/1975 | Zimmerman | |
| 4,242,806 A | 1/1981 | McClaren | |
| 4,249,891 A | 2/1981 | Noyes et al. | |
| 4,424,634 A * | 1/1984 | Westelaken | ........... F26B 17/122 34/167 |
| 4,502,229 A | 3/1985 | Kitzman | |
| 4,914,834 A | 4/1990 | Sime | |

(Continued)

FOREIGN PATENT DOCUMENTS

SU        635382 A1 *  11/1978

OTHER PUBLICATIONS

Sukup Grain Dryers Brochure, L1130-012015P, 2015, 12 pages.

(Continued)

*Primary Examiner* — Jason Lau
(74) *Attorney, Agent, or Firm* — Zarley Law Firm, P.L.C.

(57) ABSTRACT

A grain dryer having a mixed-flow heating section, a tempering transition section, and a vacuum-cooled crossflow cooling section. A fan positioned on the end of the dryer creates a negative pressure in the cooling plenum that pulls air through the grain, warming the air while cooling the grain. This warmed air is pulled through the fan and then passed through a heater to bring it to appropriate drying temperature. This air is then pushed into a heating plenum, where it passes through a mixed-flow grain column, drying the grain, and then exhausted to ambient air.

7 Claims, 3 Drawing Sheets

(56) References Cited

U.S. PATENT DOCUMENTS

| | | |
|---|---|---|
| 5,228,207 A | 7/1993 | Michel et al. |
| 2013/0014404 A1 | 1/2013 | Bloemendaal |
| 2015/0226482 A1 | 8/2015 | Bloemendaal |
| 2015/0241123 A1* | 8/2015 | Morrison ................ F26B 17/12 34/86 |
| 2015/0260455 A1 | 9/2015 | Lallouet |
| 2015/0369537 A1 | 12/2015 | Meier |
| 2016/0054058 A1 | 2/2016 | Pauling |

OTHER PUBLICATIONS

Grain Handler, "Continuous Mixed Flow Dryers Fan Under Series" www.grainhandler.com, Grain Handler Brochure, 1991(?), 6 pages.
Neco, "The Right Dryer For The Job" "Unsurpassed Grain Quality" Brochure 2015, 6 pages.
Danish Technical Examination, "Search Report and Written Opinion" by the Examiner from Danish Patent and Trademark Office in Denmark, for Danish Patent Application No. PA 2017 00254, dated Oct. 17, 2017, 8 pages.

* cited by examiner

US 10,378,820 B2

MIXED FLOW GRAIN DRYER WITH VACUUM COOL HEAT RECOVERY SYSTEM

BACKGROUND OF THE INVENTION

This invention is directed to an improved mixed flow grain dryer and more particularly a mixed-flow grain dryer having a vacuum cool heat recovery system.

Various methods of drying grain are well-known in the art. Cross-flow dryers provide airflow in a direction perpendicular to the flow of the grain. They utilize perforated screens to hold the grain into columns while allowing air to pass through. This results in uneven temperature distribution of grain in the column. A further development of the cross-flow design allows for recovering heat from grain as it is cooled in the column, dramatically increasing fuel efficiency. This process is known as vacuum-cooling. The perforated screens minimize the amount of particulate drawn out of the grain column so that the warmed air may be recycled into the dryer with minimal risk of fire.

Mixed-flow dryers utilize lower airflow, slower grain heating rates and give consistent air temperature and humidity to all the grain going through the dryer. Both of these things are beneficial to grain quality and drying efficiency. Because of the large airflow ducts in mixed-flow dryers, however, they must utilize pressure-cooling to keep particulate in the grain from entering the fan, heater, and drying plenum where a fire could start. With this design, air heated by the grain cooling process is exhausted to the atmosphere. Not only is this wasteful, but the process reduces the fuel efficiency of the grain dryer. Therefore, a need exists in the art for a dryer that addresses these problems.

An objective of the present invention is to provide a grain dryer that utilizes a mixed-flow drying chamber and recirculates air heated during a cross-flow cooling process.

Another objective of the present invention is to provide a grain dryer that increases fuel efficiency while maintaining optimal grain quality.

These and other objectives will be apparent to those skilled in the art based upon the following written description, drawings, and claims.

SUMMARY OF THE INVENTION

A grain dryer having an inlet for wet grain at the top. A wet-grain holding section or hopper in communication with a mixed-flow heating section having a pair of grain columns separated by a positively pressurized heating plenum. The columns have alternating duct openings on both inner and outer walls that provide equal length air paths to the ambient air.

Below the heating section is a tempering transition section, having baffles positioned such that grain flows evenly across the columns from the heating section to the cooling section. Below the transition section is a cooling section, having a pair of columns separated by a negatively pressurized plenum. The cooling section has perforated inner and outer walls. The grain columns of the cooling section are metered into a singular unloading conveyor. There is a fan and heater on the end of the dryer in communication with both the heating and cooling plenums such that ambient air is drawn through the grain in the cooling section, heated as the grain cools, then drawn into the fan and heater where additional heat is added to bring it to appropriate drying temperature. Then air is pushed into the mixed-flow drying chamber and through the heated grain column.

DETAILED DESCRIPTION OF THE PREFERRED EMBODIMENTS

Figure 1:
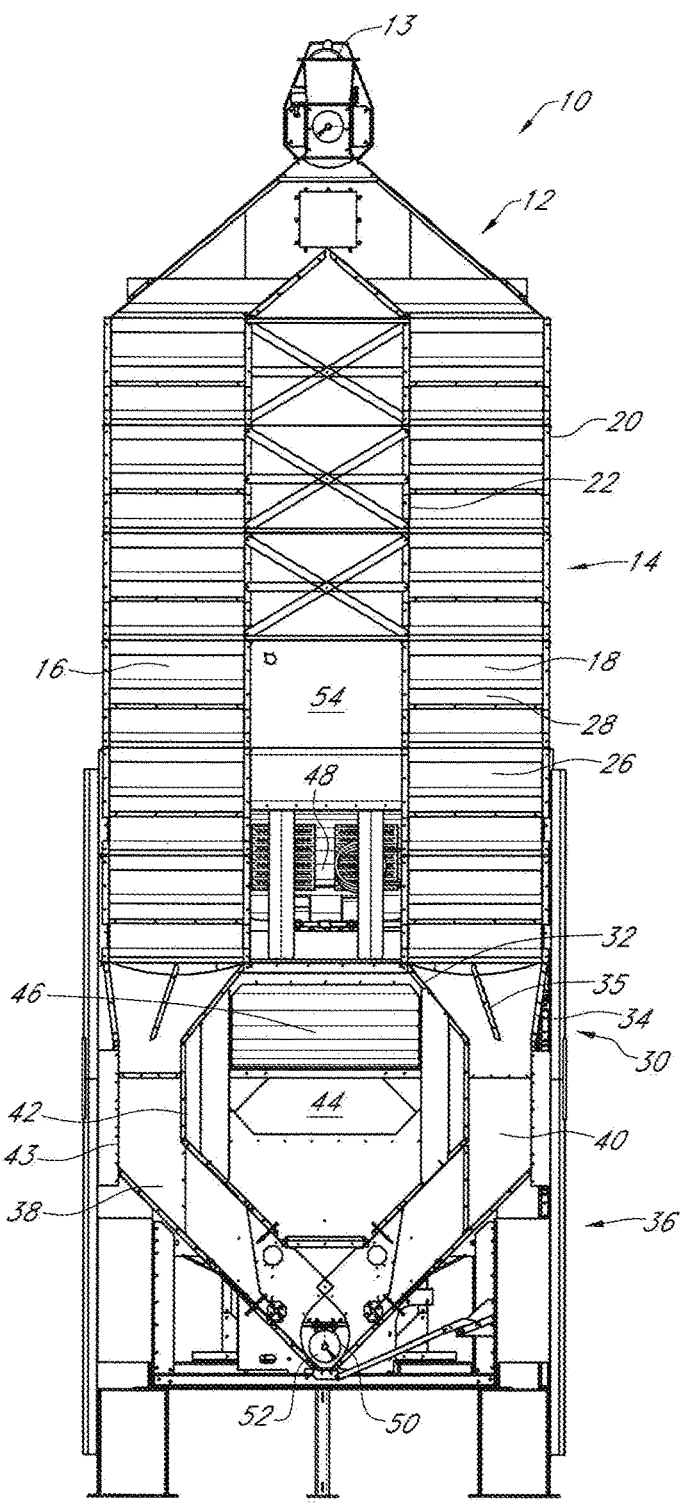
FIG. 1 is a side sectional view of a mixed flow grain dryer.
Figure 2:
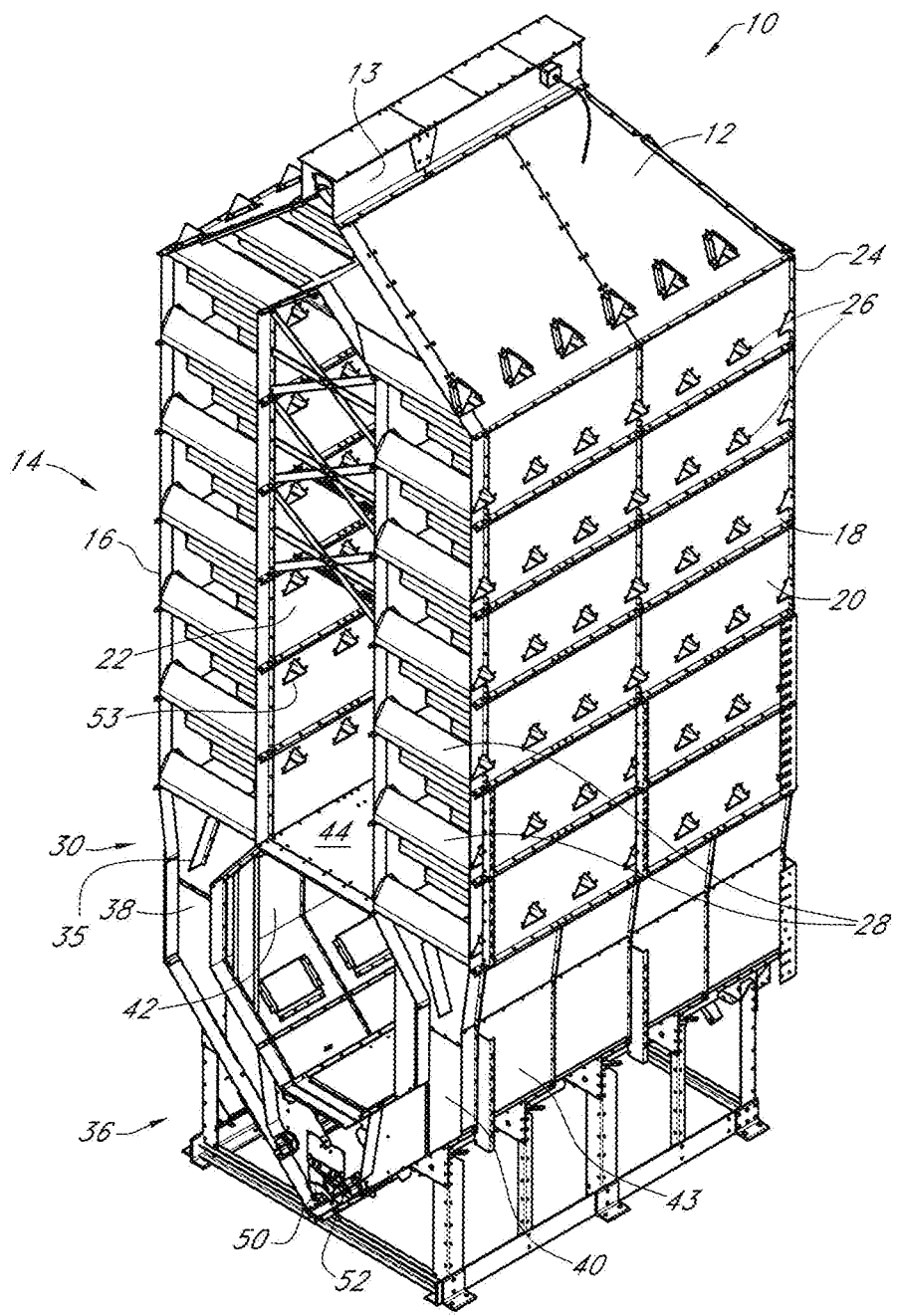
FIG. 2 is a perspective sectional view of a mixed flow grain dryer.
Figure 3:
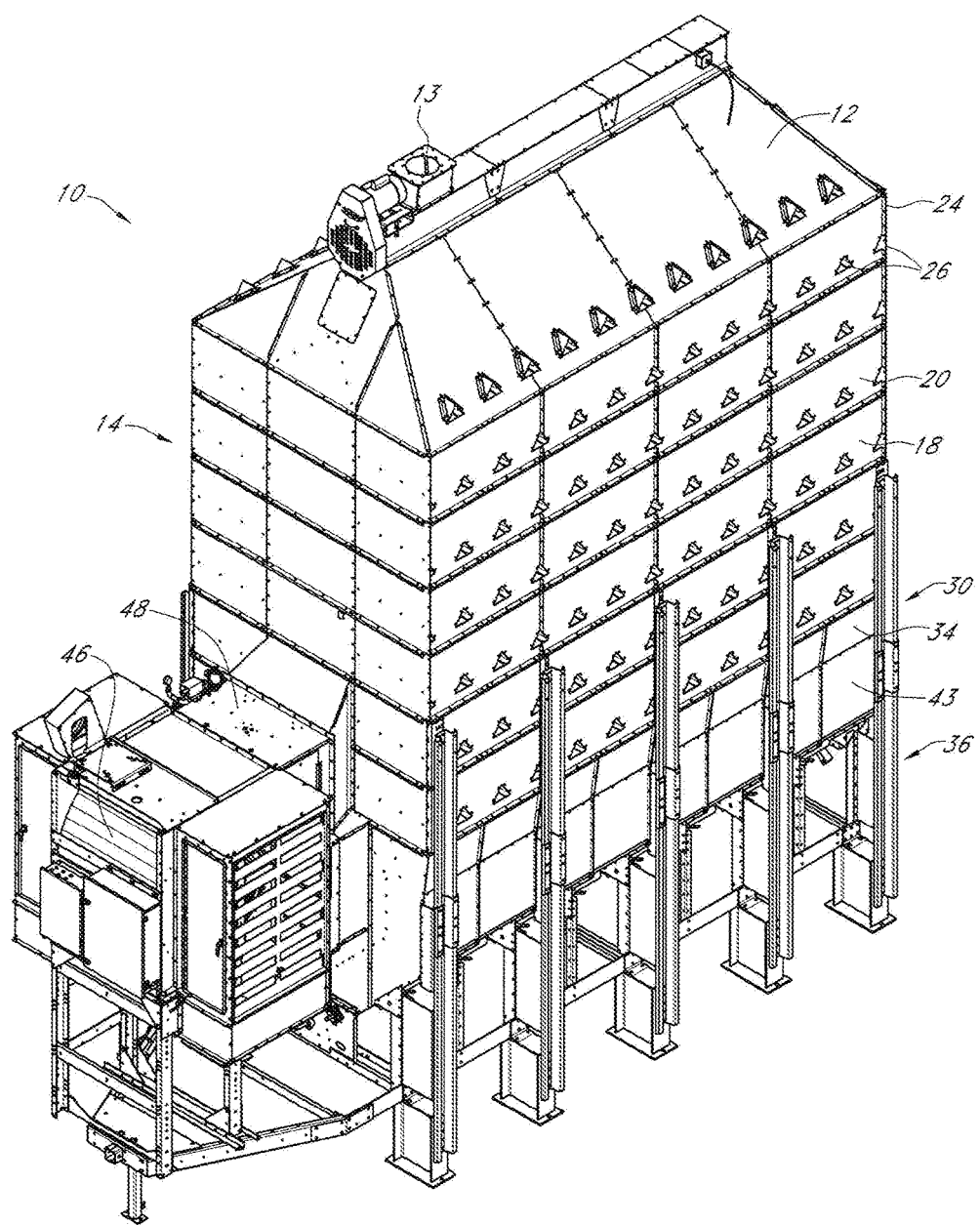
FIG. 3 is a perspective view of a mixed flow grain dryer.

Referring to the figures, a mixed flow dryer 10 has a wet hold section 12 that acts as a holding bin for grain flowing through an inlet port 13 of the dryer 10. The wet hold section 12 is in communication with and distributes grain to a heating section 14 having a pair of separated heating columns 16, 18. The heating columns 16 and 18 each have an outer wall 20 and an inner wall 22 that preferably are thirty inches apart. Both the outer 20 and inner 22 walls have a plurality of alternating rows of ducts 26 that provide equal length air paths from the inner wall 22 to the outer wall 20. Preferably, the ducts 26 are triangular in shape.

At the bottom of and in communication with the heating columns 16 and 18, is a tempering transition section 30. The tempering transition section 30 has a solid inner 32 and outer 34 wall that prevents air from passing through the transition section 30. Within the transition section 30 is a grain distribution baffle 35 positioned below heating columns 16 and 18 to equalize the grain flow distribution in both the heating section 14 and cooling section 36.

The transition section 30 is in communication with a cooling section 36 having a pair of cooling columns 38 and 40. Preferably, the cooling columns 38 and 40 have perforated inner 42 and outer 43 walls that are narrower than the heating columns 16 and 18 and in one example are fourteen inches wide.

Between the cooling column 38 and 40, the transition section 30, and below the heating columns 16 and 18 is a plenum 44. On the end of the dryer 10, fan 46 creates a negative pressure within the plenum 44 compared to the outside air. In communication with the plenum is a heater 48. Perforated screens/walls are used in the vacuum cooling chamber/section 36 to minimize the introduction of particulate matter into the recovered air stream. Use of perforated screens prevent issues arising from passing materials through the fan 46 and heater unit 48, and keep the drying plenum clean and free from debris. This allows for passing recirculated air through the heating unit 48.

In operation, grain enters the dryer 10 through inlet port 13 and into the wet hold section 12. From the wet hold section 12, grain flows into heating columns 16 and 18 of heating section 14 to the tempering transition section 30.

Within the tempering transition section 30, the grain engages baffle 35 and is directed to columns 38 and 40 of the cooling section 36. From the cooling section 36, grain flows to an unloading section 50. In communication with the unloading section 50 is a single discharge conveyor 52 such as an auger, drag conveyor, belt conveyor or the like. This is novel compared to present two-column, mixed-flow dryers that have at a minimum of two separate conveyors.

Outside or ambient air flows through perforated outer wall 43 to the perforated inner wall 42 of cooling columns 38 and 40 and into the plenum 44 due to the negative pressure created by fan 46. As the ambient air flows through the grain within cooling columns 38 and 40, the air is heated while it cools the grain. The heated air received within the plenum 44 from cooling columns 38 and 40 is pulled into fan 46 and then further heated by heater 48, before entering plenum 54. Because the air entering the plenum 44 from cooling section 36 is already heated, less energy is needed to heat the air to appropriate drying temperature within the plenum 54.

The heated air then flows to the heating section 14. From the heating section 14, air flows through inner duct openings 53 towards the air paths in columns 16 and 18 to heat and dry the grain in the heating section 14 before heated air is exhausted through outer duct openings 26 on outer walls 20 of columns 16 and 18.

Thus, a grain dryer having a vacuum-cool heat recovery system has been disclosed that is more energy efficient and at the very least meets all of the stated objectives.

What is claimed is:

1. A grain dryer, comprising:
   a wet holding section in communication with a mixed-flow heating section;
   a tempering transition section having solid inner and outer walls adapted to prevent air from passing through the tempering transition section in communication with the mixed-flow heating section;
   a crossflow vacuum-cooling section in communication with the tempering transition section;
   an unloading section in communication with the crossflow vacuum-cooling section;
   a negatively pressurized plenum within the crossflow vacuum-cooling section, between the tempering transition section and the unloading section having a fan in communication with a heater; and
   wherein the tempering transition section is positioned between the mixed-flow heating section and the crossflow vacuum-cooling section and ambient air flows through the crossflow vacuum cooling section, is pulled into the fan, and then further heated by the heater.

2. The dryer of claim 1 further compromising a positively pressurized plenum within the mixed-flow heating section.

3. The dryer of claim 1 further comprising a discharge port in communication with only one discharge conveyor.

4. The dryer of claim 1 having a grain distribution baffle within the tempering transition section; wherein the grain distribution baffle is positioned below the mixed-flow heating section and is configured to equalize flow distribution in the mixed-flow heating section and the crossflow vacuum cooling section.

5. The dryer of claim 1 wherein the heating section is above the tempering transition section and the crossflow vacuum-cooling section is below the tempering transition section.

6. The dryer of claim 1 further comprising the mixed-flow heating section having a pair of heating columns, wherein the pair of heating columns have a plurality of alternating rows of ducts.

7. The dryer of claim 6 wherein the plurality of alternating rows of ducts have equal length air paths between an inner wall and an outer wall of the pair of heating columns.

\* \* \* \* \*